June 29, 1926.
N. C. CHRISTENSEN
1,590,229
PROCESS FOR MAKING ANHYDROUS ZINC CHLORIDE
Filed June 7, 1923
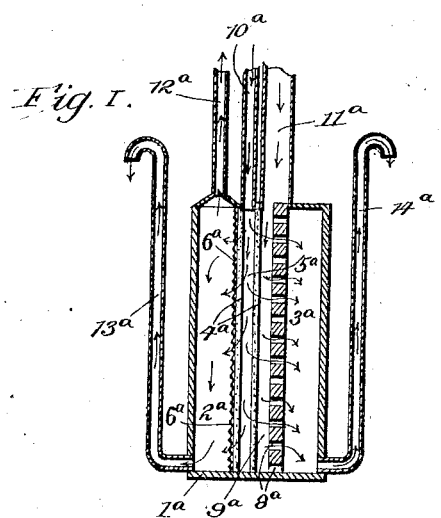
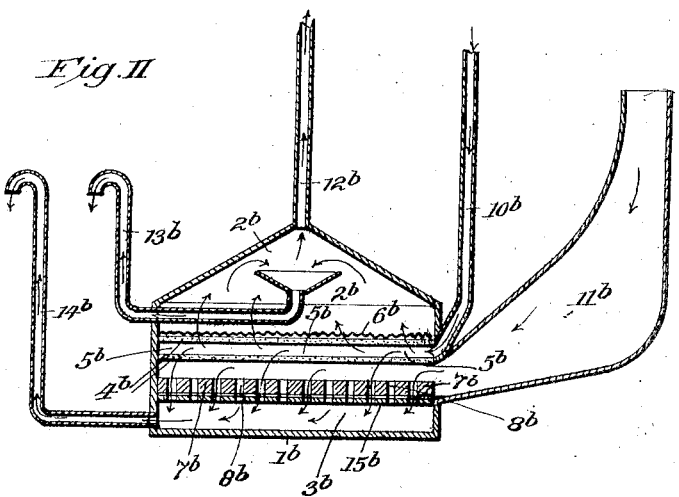
Inventor:
Niels C. Christensen
by Witzig and Johns
Attorneys.

Patented June 29, 1926.

1,590,229

UNITED STATES PATENT OFFICE.

NIELS C. CHRISTENSEN, OF SALT LAKE CITY, UTAH.

PROCESS FOR MAKING ANHYDROUS ZINC CHLORIDE.

Application filed June 7, 1923. Serial No. 644,043.

This invention relates primarily to the manufacture of anhydrous zinc chloride and the recovery of lead from lead chloride and secondarily to the manufacture of caustic alkali and also to the refining of lead bullion. As is well known to chemists and metallurgists, the manufacture of anhydrous zinc chloride from zinc chloride solutions is a delicate and rather difficult operation because of the tendency of the zinc chloride to break up into zinc oxide and hydrochloric acid and to form oxychlorides upon evaporation of the zinc chloride solution. It is also well known that for many purposes the presence of zinc oxide in the zinc chloride is very deleterious.

It is the object of my invention to provide a simple cheap and efficient method of manufacturing anhydrous zinc chloride, free from the ordinary difficulties encountered in evaporating solutions, and to produce a zinc chloride free from zinc oxide or oxychloride. It is also the object of my invention to recover the lead from lead chloride made in the treatment of lead ores and metallurgical products by the chloride process described in my Patents Nos. 1,434,085, 1,441,063, 1,441,064, 1,441,065, 1,435,891, 1,434,087, 1,390,603, 1,415,796, 1,434,088, 1,539,711, 1,539,712, 1,539,713 and 1,539,714.

It is also the object of my invention to provide a combined method of manufacturing anhydrous zinc chloride and caustic alkali, and also to provide a simple combined method of manufacturing anhydrous zinc chloride and caustic alkali and at the same time refining lead bullion.

My process is simple in operation requiring no extreme conditions of temperature or pressure or special protection against corrosive gases, and has a very high efficiency in that a practically complete conversion and recovery of the chemicals used may readily be secured. The simplicity and efficiency of the operation is such that comparatively simple apparatus may be used.

My process consists in general of heating dry lead chloride with metallic zinc and separating the anhydrous zinc chloride from the lead formed by this treatment. The operation is preferably carried out by heating the dry lead chloride until it melts thus driving off all traces of moisture and then adding the metallic zinc either in the solid form or in a molten condition. The zinc displaces the lead in the chloride forming molten anhydrous zinc chloride and molten metallic lead as indicated in the following chemical equation:

$$PbCl_2 + Zn = ZnCl_2 + Pb.$$

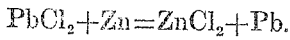

This reaction is exothermic and generates some heat or may generate a small voltage if the apparatus used is in the form of an electric cell. The molten zinc chloride and melted lead are readily separated and cast into any desired form.

The $PbCl_2$ used in my process is preferably made by the treatment of lead ores with a hot concentrated brine, containing acid or ferric chloride, in such proportion as to secure a hot concentrated lead chloride solution which is then cooled so as to precipitate lead chloride therefrom. The hot brine containing acid or ferric chloride acts very readily on oxidized ores of lead and also readily on sulphide ores of lead dissolving the lead as a chloride in the brine. The methods of treating lead ores for the recovery of the lead as a chloride is described in my Patents Nos. 1,434,087, 1,390,603, 1,415,796, 1,434,088, 1,434,085, 1,441,063, 1,441,064, 1,441,065 and 1,435,891, and patent applications Nos. 327,400, 330,320, 329,333 and 322,691. The method I prefer to use is that of dissolving the lead out of the ores with a brine containing hydrochloric acid in sufficient quantity to react with the lead mineral in the ore and form $PbCl_2$, as the product is more easily secured as pure lead chloride when HCl is used than when $H_2SO_4$ or $FeCl_3$ are used to dissolve the lead. If the ore treated is a sulphide the pregnant solution should have all the $H_2S$ removed by boiling or by passing air through the solution, before cooling and precipitating the $PbCl_2$, so as to avoid the carrying of any sulphide into the process for the manufacture of the $ZnCl_2$.

The $PbCl_2$ may also be made by the dissolving lead chloride from volatilizing processes in a hot brine and precipitating by cooling; it may also be made by dissolving scrap lead such as battery plates and other forms of scrap in a hot acid brine and cooling as described for the treatment of ores, as the metallic lead dissolves readily in a hot acid brine.

The lead chloride may also be made in connection with the manufacture of caustic alkali from sodium chloride solutions, by using metallic lead as the anode in a double diaphragm type of electrolytic caustic cell, the chlorine acting on the lead anode to form lead chloride which dissolves in the hot sodium chloride which is within drawn from the cell when concentrated in regard to $PbCl_2$ and cooled to precipitate $PbCl_2$. This process gives Na(OH), H and $PbCl_2$ as indicated in the following chemical equations:

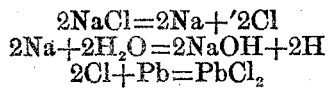

$$2NaCl = 2Na + '2Cl$$
$$2Na + 2H_2O = 2NaOH + 2H$$
$$2Cl + Pb = PbCl_2$$

This process is preferably carried out as follows:

An electrolytic caustic alkali cell of the construction shown in the drawings is preferably used, though other types may be utilized. The new and essential feature of the cell are the double diaphragm which makes possible the divided and separate flow of electrolyte which makes possible the manufacture of two soluble products such as NaOH and $PbCl_2$ at the same time in an electrolytic cell. Both Figs. I and II show a vertical cross-section of two types of cell which may be used. The construction and operation of the cells will be clear from the drawings and the following description:

In the description and drawings the same numbers indicate corresponding parts in the two cells, the subscript "a" referring to the vertical type shown in drawing I and the subscript "b" to the horizontal type shown in drawing II. The space enclosed in the cell ($1^a$, $1^b$) is divided into two main parts ($2^a$, $2^b$), the cathode compartment in which the caustic is formed, and ($3^a$, $3^b$) the anode compartment in which the $PbCl_2$ is formed, by the double diaphragm ($4^a$, $4^b$) which incloses a narrow space ($5^a$, $5^b$). In the caustic portion or cathode compartment ($2^a$, $2^b$) of the cells is a cathode ($6^a$, $6^b$) consisting of an iron screen or plate, perforated so as to allow the electrolyte to flow through it, placed in close proximity to the diaphragm adjacent to this portion of the cell. In the anode compartment ($3^a$, $3^b$) is placed a lead anode ($7^a$, $7^b$) which is cast with perforations ($8^a$, $8^b$) to allow the passage of the electrolyte through it. A space ($9^a$, $9^b$) separates the lead anode ($7^a$, $7^b$) from the diaphragm adjacent to the anode compartment of the cell. The inlet pipe ($10^a$, $10^b$) allows a flow of hot lead-free brine into the space ($5^a$, $5^b$) between the two diaphragms ($4^a$, $4^b$) of the double diaphragm. The inlet passage ($11^a$, $11^b$) allows an inflow of hot brine, not saturated with lead chloride, to the space ($9^a$, $9^b$) between the lead anode ($7^a$, $7^b$) and the diaphragm ($4^a$, $4^b$). The pipe ($12^a$, $12^b$) allows the hydrogen to escape from the cathode compartment. The pipe ($13^a$, $13^b$) allows the sodium hydroxide solution to flow out of the cathode compartment ($2^a$, $2^b$) and the pipe ($14^a$, $14^b$) allows the lead chloride solution to flow out of the anode compartment ($3^a$, $3^b$). In the horizontal type of cell shown in Fig. II, the cathode rests on the perforated support ($15^b$). In both cases the channel ($11^a$, $11^b$) is made large enough so that the residue of lead anode may be removed for remelting and recasting when sufficient lead has been dissolved from it, and another anode may be slipped into its place through this channel.

The cells are operated as follows: Hot brine is continuously supplied to the space ($5^a$, $5^b$) enclosed in the double diaphragm ($4^a$, $4^b$) under sufficient lead to cause it to pass through the diaphragms into the anode and cathode compartment cells at such a rate as to prevent any diffusion of the NaOH and $PbCl_2$ from the cathode and anode compartments back through the diaphragms into the space ($5^a$, $5^b$). The diaphragm next to the anode compartment ($3^a$, $3^b$) of the cell may be made of higher resistance than the diaphragm on the cathode side since a minimum flow of brine through the diaphragm into the anode compartment is desired. The rate of flow through the cathode compartment is regulated so as to secure an outflow of caustic solution of the desired strength through the outlet ($13^a$, $13^b$). Hot brine carrying the amount of $PbCl_2$ not precipitated by cooling is continuously circulated through the anode space, being supplied through the channel ($11^a$, $11^b$) passing into the space ($9^a$, $9^b$) through the perforation ($8^a$, $8^b$) in the cathode ($7^a$, $7^b$) and out through the pipe ($14^a$, $14^b$). The flow of the different solutions is indicated by the arrows. As will be noted the cells are so arranged that a uniform flow of solution through both electrodes is secured. With current supplied to the cell hot brine passes through the diaphragm into the anode compartment where Na(OH) and hydrogen are formed at the anode, the NaOH flowing out through the pipe ($13^a$, $13^b$) and hydrogen escaping through the outlet ($12^a$, $12^b$). The chlorine passing to the anode attacks the lead anode forming $PbCl_2$ which is dissolved by the hot brine which is continuously circulated through the anode compartment, being admitted through the channel ($11^a$, $11^b$) passing through the perforations ($8^a$, $8^b$) in the anode and being discharged from the anode compartment ($3^a$, $3^b$) through the pipes ($14^a$, $14^b$). Sufficient brine flows from the space ($5^a$, $5^b$) through the diaphragm into the anode compartment to prevent any diffusion of $PbCl_2$ into the space ($5^a$, $5^b$). The lead chloride brine is circulated through the anode compartment at such a rate as to build the lead in solution up to between 6% and 7½%. This pregnant lead solution flowing from the cell is cooled and the lead chloride precipitated so that the cold solution carries from 1½% to 2% Pb. This cold solution is heated practically to boiling and returned to the cell again through the inlet channel (11ª, 11ᵇ). As the formation of the lead chloride at the anode generates an E. H. F. of approximately 1.8 volts this cell operates with approximately one half the power consumption of the ordinary caustic alkali-chlorine cell. As the lead-brine circuit is continuously augmented by the small amount of brine passing into the anode compartment through the diaphragm, the lead must be precipitated from a portion of this solution at intervals with NaOH and the Pb(OH)$_2$ separated from the brine and treated with HCl and returned to the hot lead brine and the purified brine used over again. The horizontal type of cell shown in Fig. II is my preferred type as the specific gravity of the solutions formed in the cell are such that the natural flow of solution through the cell is in the direction desired.

As will readily be seen this cell and process may be used for the refining of lead bullion by using the bullion in the anodes as in ordinary electrolytic refining, the lead being recovered from the pure chloride formed by treatment with metallic zinc as described. In this case the combined process of making the lead chloride and zinc chloride would have the following final products: anhydrous ZnCl$_2$, NaOH, H, and refined Pb. In case the cell is not used for refining the molten lead from the ZnCl$_2$, manufacture is cast into anodes and used over again in the process. In all my methods of making PbCl$_2$ except the last described caustic cell method either a sodium chloride or calcium chloride solution or brine may be used and by the term brine used in the claims I means either a concentrated sodium chloride or calcium chloride solution.

The lead chloride made by any of the methods indicated above is washed free from contaminating salts and thoroughly dried. It is then melted preferably in a neutral atmosphere to prevent the formation of any lead oxychloride and metallic zinc is added to the molten lead chloride in the proportion required to decompose the lead chloride and form anhydrous zinc chloride which is in a molten condition and is readily poured off the molten metallic lead which is formed. This operation is preferably carried out in a fused-silica Vitrossil retort externally heat. Other material may be used for the retort but in order to avoid contamination of the ZnCl$_2$ and on account of its heat resisting qualities I have found vitrosil to be the most suitable material. Iron or copper retorts may be used but are slightly acted upon by the fused PbCl$_2$ and for that reason are not well suited for the purpose. Porcelain and graphite crucibles have been tried but the former is easily broken in heating and handling and the latter is slightly permeable to both the PbCl$_2$ and the AlCl$_3$ so that neither are well suited to the purpose. The retort should preferably be air tight so as to avoid slight oxidation of the lead chloride and decomposition of the ZnCl$_2$ which occur if much air is admitted during the heating.

From the foregoing it will be apparent that my process constitutes a simple and valuable method of manufacturing anhydrous zinc chloride and at the same time recovering the lead from lead chloride formed in the treatment of ores by leaching with chloride solutions. It will also be apparent that my process constitutes a simple and valuable method of manufacturing anhydrous zinc chloride and at the same time recovering lead from scrap metal such as battery plates and other forms of scrap lead. It will also be apparent that my processes constitutes a simple and valuable method of manufacturing anhydrous zinc chloride and at the same time manufacturing caustic soda and hydrogen. It will also be apparent that my process constitutes a simple and valuable method of manufacturing anhydrous zinc chloride and at the same time refining lead bullion and manufacturing caustic soda and hydrogen.

As will be clear to all engineers engaged in the metallurgical field, it is impossible to give all the minute details of practical operation of the different parts of my process or all the details of construction of the apparatus used and I do not therefore desire to be limited by the foregoing necessarily brief description except as interpreted in the claims, though the foregoing description is ample to make the invention and its practical use clear to all engineers or metallurgists familiar with the metallurgical and chemical practices involved in similar and related operations.

Having described my process, what I claim and desire to patent is:

1. The process of making anhydrous zinc chloride which consists in heating dry lead chloride together with metallic zinc whereby anhydrous zinc chloride and metallic lead are formed.

2. The process of making anhydrous zinc chloride which consists in heating dry lead chloride together with metallic zinc, and thereby reducing the lead chloride and forming metallic lead and anhydrous zinc chloride.

3. The process of making anhydrous zinc chloride which consists in heating dry lead chloride together with metallic zinc, whereby metallic lead and anhydrous zinc chloride are formed, and separating said molten zinc chloride from the melted lead formed.

4. The process of making anhydrous zinc chloride which consists in heating dry lead chloride together with metallic zinc, and thereby reducing the lead chloride and forming metallic lead and anhydrous zinc chloride and separating said molten zinc chloride from the molten lead formed.

5. The process of making anhydrous zinc chloride which consists in adding metallic zinc to molten lead chloride whereby molten metallic lead and molten anhydrous aluminum chloride are formed.

6. The process of making anhydrous zinc chloride which consists in adding metallic zinc to molten lead chloride and thereby reducing the lead chloride and forming molten metallic lead and molten anhydrous aluminum chloride, and separating said molten zinc chloride from said melted lead.

7. The process of making anhydrous zinc chloride which consists in dissolving metallic lead in a hot concentrated brine by using metallic lead as the anode of a double diaphragm caustic alkali cell substantially as described and forming a hot concentrated lead chloride solution, cooling said concentrated lead chloride solution and precipitating lead chloride therefrom, separating said lead chloride from said brine, drying said lead chloride, heating said dry lead chloride together with metallic zinc and forming metallic lead and anhydrous zinc chloride and using said metallic lead over again in the anode material of said cell in said process.

8. The process of making anhydrous zinc chloride which consists in dissolving metallic lead in a hot concentrated brine by using lead bullion as the anode of a double diaphragm caustic alkali cell substantially as described and forming a hot concentrated lead chloride solution, cooling said concentrated lead chloride solution and precipitating lead chloride therefrom, separating said lead chloride from said brine, drying said lead chloride, heating said dry lead chloride together with metallic zinc and forming molten metallic lead and molten zinc chloride, and separating said zinc from said molten lead.

9. The combined process of making caustic alkali, hydrogen, and anhydrous zinc chloride which consists in using metallic lead as the anode in a double diaphragm caustic alkali cell substantially as described and thereby making caustic alkali, hydrogen and lead chloride, and heating said dry lead chloride together with metallic zinc so as to form anhydrous zinc chloride and metallic lead, and using said metallic lead over again in the anode material of said cell in said process.

NIELS C. CHRISTENSEN.